Patented Aug. 23, 1938

2,127,789

UNITED STATES PATENT OFFICE 2,127,789

PROCESS FOR THE STABILIZATION OF CELLULOSE ESTERS

Otto Sindl, Paris, France, and Georg Frank, Moedling, near Vienna, Austria, assignors to "Afag" Finanzierungs A. G., Schaffhausen, Switzerland No Drawing. Application September 25, 1936, Serial No. 102,628. In France October 9, 1935

6 Claims. (Cl. 260—102)

Our copending application for U. S. Letters Patent Serial No. 649,358, filed December 29, 1932, now Patent No. 2,066,584, of which the present application is in some respects a continuation-in-part, describes a process for the stabilization of cellulose esters which consists in treating the esters, separated from the reaction bath, in the swollen state and without dissolving them, with liquids capable of eliminating from the cellulose ester the harmful contaminations which it contains without dissolving appreciable quantities of the ester. This treatment may be effected at elevated temperature and pressure. The contaminations to be eliminated are mostly sulpho-compounds of the cellulose ester, which appear during the previous esterification, being formed under the action of a catalyst containing radicals derived from sulphuric acid.

As appropriate stabilizing liquids the above-mentioned patent mentions the lower fatty acids and their esters.

If all hydrolyzing action of the stabilizing agent on the organic groups of the cellulose ester has to be excluded, alcohols or other compounds containing hydroxyl groups and acting as hydrolyzing agents cannot be used as stabilizing agents, at least when the cellulose ester still contains such quantities of residues of the catalyst as are capable of appreciably accelerating the hydrolysis.

Now it has been found that in order to stabilize the cellulose esters without having recourse to saponification, not only can the lower fatty acids and their esters be used, but just as advantageously other derivates of fatty acids and of their esters. The most important amongst the compounds suitable for use as stabilizing agents, conforming to the present invention, are the following organic compounds: the polybasic organic acids and their esters, the acid-esters, the esters of the polyhydroxy-compounds, the hydroxy-acids etherified in the hydroxy-group and their esters, the acid-ethers and their esters (ester-ethers).

The compounds mentioned above can be designated under the general formula: $R'(OR'')_n (COOR''')_m$, the formula designating however only the radicals of which these compounds consist and not the character of their linkages. In this formula, $R'$, $R''$ and $R'''$ means respectively a low-molecular hydrocarbon residue which may be substituted with a halogen residue, a nitro residue or an analogous residue indifferent with regard to the cellulose ester. $R'$ and $R'''$ can also mean hydrogen. $R'$ may also be absent. The indices $m$ and $n$ may be equal to or greater than 1; $n$ may also be equal to zero. However, since the cases $n=0$ and $m=1$ were already foreseen in the specification of United States application No. 649,358 (now Patent No. 2,066,584) $n+m$ must be equal to or greater than 2. One or several compounds of this kind may be used for the stabilization simultaneously or consecutively, in a non-diluted state or in presence of an indifferent diluent. Diluents will be used particularly when the undiluted stabilizing agent has a marked dissolving power with respect to the cellulose ester.

The stabilization process is carried out by means of a combination of treatments, at room temperature and elevated temperature, of the cellulose ester freed from the esterification bath. First, at ordinary temperature, residues of the catalyst are removed which are retained in a physical manner, for instance by absorption, finally at elevated temperature those are removed which are chemically fixed. The stabilization may be stopped when a sufficient portion of the catalyst retained by the cellulose ester has been eliminated to exclude any harmful action. If desired or necessary the stabilization is followed by a rinsing process, an extraction or a displacement, with a view to eliminating completely the residues of the stabilizing agent, or possible traces of the catalyst, and especially completely to free the cellulose ester of fatty acids. In the latter case, one may even use compounds capable of hydrolyzing, such as an alcohol and water, an appreciable hydrolytic action of these compounds being no longer possible if the appropriate conditions are observed and above all if the residues of the catalyst have been very carefully removed by a preliminary treatment. All these modes of operation are applicable to the new group of compounds. In the class of stabilizing compounds to be used in conformity with the present invention, there are some which possess a larger stabilizing power than that of the fatty acids which have not undergone a substitution and their esters, preconized by the specification of United States application No. 649,358. On the other hand, one finds, among the compounds newly indicated, bodies the use of which procures other advantages over that of the compounds previously proposed with the same end in view. Generally speaking, the stabilizing power corresponds with the solvent power with respect to sulphuric acid, which however does not mean that the bodies with less solvent power for sulphuric acid are not utilizable as stabilizing agents at all.

In certain cases, one may, by mixing two or more compounds, obtain a mixture of an increased stabilizing power and superior to that of each one of the constituents. As components of such stabilizing compositions, one may use as well at the same time as the above stated compounds, such compounds as are described in the specification of our acknowledged Patent No. 2,066,584, that is, lower fatty acids and their esters which are incapable of hydrolytic action, if desired diluted by appropriate liquids. The compounds comprising, in addition to a carboxyl group or an etherified carboxyl group, other oxygen-containing groups, such as the ether group, are distinguished by superior stabilizing power. The compounds containing the acetyl residue give, in general, better results than the derivatives of higher fatty acids.

By using the class of compounds which forms the feature of the new process according to the invention, the duration of the stabilization will generally be shortened, also because of the possibility of stabilizing at a higher temperature, without applying a pressure higher than that of the atmosphere, the boiling point of these compounds being higher than that of the compounds which have not undergone a substitution.

The employment of one part of the members of the group newly indicated offers another essential advantage, namely of being more suitable as diluting (non-solvent) agents during the esterification, and in this way of simplifying the whole production of the cellulose ester. The diluents used during the esterification must possess, among others, the following properties: they must have a swelling power for the cellulose ester but without exercising any appropriate dissolving power on such ester; they must easily be separable, for instance by distillation, from the acylating agent and from the acid which is formed by the decomposition of the latter; finally they must have a dissolving power which is as large as possible for sulphuric acid, if this is used as a catalyst during the esterification. One may, without difficulty, choose from the group newly indicated those compounds suitable for effecting the stabilization a whole series of bodies presenting all the qualities, according to what has been said above, required for a diluting non-solvent agent used as constituent of the esterification bath.

When using the same compound as stabilizing and as diluting agent for esterification in heterogeneous medium, the very economical countercurrent principle may be employed in all the phases of the process. Having used the stabilizing liquid first to stabilize and secondly to wash in the cold, it still can be used, after adding the acylating agent as esterification bath. After this the fatty acid, which accumulates in such an esterification bath during its application, may be used, after neutralization of the residues of the catalyst, for a pretreatment of the cellulose intended for a new batch, during which pretreatment the fatty acid is partly absorbed by the cellulose. It is only after such repeated use of the treatment liquid that the residual fatty acid is separated from the stabilizing liquid, for example by distillation.

Generally it is necessary, as disclosed in the specification of our acknowledged U. S. patent, to carry out the stabilization process in repeated steps by means of stabilizing compounds or mixtures thereof, as the accumulation of residues of the catalyst might rapidly reduce the stabilizing power of the stabilizing liquid and cause acidolytic decomposition of the cellulose ester. The regeneration of the stabilizing liquid may be carried out by an appropriate method, in continuous or discontinuous manner, for example by the neutralization or the adsorption of the generally acid impurities by using carbonate of calcium, calcium oxide, basic silicates with active surface, etc. Another method may also be used, consisting in an esterification of acid impurities, by addition of rather small quantities of alcohol such as not to provoke an appreciable saponification of the acyl radicals of the cellulose ester. The traces of water formed during such neutralization or esterification are not generally harmful to the stabilization process. However, if desired, they can be eliminated by compounds which fix water, or by distillation.

The stabilizing process may be accelerated by employing the group of compounds constituting the basis of the invention in a manner similar to that described in the specification of our acknowledged U. S. patent by addition of inorganic catalyzing agents which do not fix on the cellulose or on the cellulose ester under conditions existing during the stabilization, as, for example, perchloric acid, hydrochloric acid, etc.

The use of a certain number of compounds of the newly described group, i. e. insoluble, or soluble to only a small extent, in water and endowed with a sufficient swelling power for the cellulose ester, in fact permits the stabilization of the fibrous ester to be carried out according to a particular method different from that described above. It enables the stabilization to be attained with smaller quantities of stabilizing agents, even in the presence of large quantities of water, without appreciable hydrolysis of the cellulose ester. After washing the fibrous ester at room temperature by means of the stabilizing liquid, the greater part of the latter is removed, and then the mass consisting of the fibrous ester and stabilizing agent adhering to it is treated with warm water. The stabilization is effected, in this case, by means of the quantity of stabilizing liquid retained by the fibres of the cellulose ester, which envelops the individual fibres, protecting them thus against the hydrolytic action of the water. The catalyst eliminated passes rapidly into the aqueous phase and is thus continually separated from the stabilizing liquid. The stabilization having been effected according to this method (which can be called the emulsion or dispersion method), the residues of the stabilizing liquid can be removed by steam evaporation at elevated temperature. This process, particularly economical, gives products the solutions of which are distinguished by a particular limpidity.

The application of the stabilization process in conformity with the present invention, however, is not limited to cellulose esters prepared by the heterogeneous or suspension method, which esters are distinguished by the preservation of the fibrous texture. The process may also be advantageously used for the stabilization of cellulose esters obtained by any other given method of production, such as the homogeneous or solvent method, where the final product is obtained by precipitation of the cellulose ester from its solution in the esterification bath. It is above all the stabilization method, called the emulsion method, described in the preceding paragraph which permits, in this case, a particularly economical realization of the stabilization. The following examples, which are by no means limitative, clearly illustrate the utilization of a certain number of compounds of the group on which the process according to the invention is based.

*Example 1.*—One part (by weight) of linters is soaked with acetic acid in excess, left at rest for 12 hours, introduced in a hydroextractor, after the style of the nitration centrifuges for instance, centrifuged down to a weight of 2.4 parts, and treated during two hours with a mixture of 10 parts of 98.5% acetic acid and 0.1 part of concentrated sulphuric acid. The centrifuged mass, centrifuged down to 2.2 parts, is acetylated by means of a mixture composed of 3.2 parts of acetic anhydride, 8.6 parts ethylglycol acetate and 0.05 part concentrated sulphuric acid (density=1.84), first with refrigeration, then at +25 to 30° C., the hydroextractor running at low speed, and with swift circulation of the liquid.

The acetylation achieved, the acetylation mixture is eliminated by centrifuging, then the acetylated fibres are treated, first twice cold and then three times at +100° C., with ethylglycol acetate, by eliminating the latter by centrifuging and each time renewing it. The first treatment at elevated temperature takes one hour, the next two treatments two hours each. Finally the stabilizing agent is removed by hot water and steam. The acetate, which is finally well washed, also in the hydroextractor, by means of warm water, shows, after drying, its charring point at 265° C.

*Example 2.*—A sample, acetylated as described in Example 1, is treated during a couple of hours, after having been preliminarily washed at low temperature with ethylglycol acetate, with boiling ethyl acetate, in a Soxhlet type apparatus, and then dried. The charring point is at 240° C.

*Example 3.*—A sample, acetylated as described in Example 1, is three times washed with cold ethylglycol acetate, three times boiled in water, the water being renewed each time, then dried. The charring point is at 235° C.

*Example 4.*—One part (by weight) of linters treated first with acetic acid and with a mixture of acetic acid and sulphuric acid, as described in Example 1, then centrifuged to a weight of 2.4 parts, is acetylated, first with refrigeration, then with gradual rise of temperature up to +25° C., with a mixture composed of 8.6 parts of butylglycol acetate, 3.2 parts acetic anhydride and 0.07 part concentrated sulphuric acid. The fibrous acetate separated from the acetylating bath is treated, twice with cold and then four times with warm, ethyl acetate. The hot treatments take from one to two hours each. For each hot treatment the ethyl acetate can be regenerated by agitating with precipitated barium carbonate and by filtering. After drying, the fibrous acetate shows a charring point of 237° C.

By adequately varying the procedure, but in an essentially analogous way, one may use in the Examples 1 to 4 compounds such as: trimethyleneglycol diacetate (boiling point 210° C.), di- and tri-ethyleneglycol diacetate, monoacetate of diethylglycerol (boiling point +208° C.), propylhydroxyacetic acid, ethyl ester of propylhydroxyacetic acid (boiling point +185° C.), acetohydroxyacetic acid, ethyl ester of acetohydroxyacetic acid (boiling point +179° C.), ethyl oxalate (boiling point +185° C.), adipic acid, monoethyl ester of adipic acid, furfuryl acetate (boiling point +176° C.), cyclohexyl acetate, phthalic acid ester, m-nitrophenyl acetic ester, β-chlorethylglycol acetate, etc.

When using, for example, triacetin or methylglycol acetate, compounds exercising a marked dissolving power on the cellulose ester, the stabilizing agent must be diluted with indifferent liquids until appreciable quantities of the cellulose ester are no longer dissolved.

The application of the stabilization process in conformity with the present invention, however, is not limited to cellulose esters prepared from cotton linters. Cellulose esters obtained by any given method and from any suitable cellulosic material, e. g. from wood pulp, can advantageously be stabilized by the process herein described.

Also the stabilization process in conformity with the present invention is not restricted to the stabilization of cellulose acetates. Cellulose propionate, cellulose butyrate may be stabilized by an adequately varied process, but in an essentially analogous way. In general all cellulose esters which have been made with the employment of a sulpho-radical-containing catalyst can be stabilized according to the process hereinbefore described.

For the industrial realization of all the operations described in Examples 1 to 4, i. e. the separation of liquids from the fibrous mass and the substitution of one liquid by another, all the current technical methods such as washing, extraction, displacement etc., may be used, as well as the apparatus adapted to such operations, such as the mixing drums, diffusers, percolators, suction filters, drum filters, "Langsieb" machines (i. e. machines in which cellulose material, e. g. in a relatively thick layer, is passed on an endless sieve belt over suction boxes for the purpose of removing liquid therefrom), presses (hydraulic or screw) and the centrifuging machines or hydroextractors (washing, extracting, nitration centrifuges, automatically charging and discharging centrifuges, with cells). For all the steps, starting with the preliminary treatment up to the ultimate drying of the final product, the same, or several different apparatus may be used. In the first case, apparatus can be used for treating one batch undivided or divided in several portions. Finally all the operations can be effected in the same apparatus and the material thus be left therein during the whole period of treatment.

We claim:

1. In the stabilization of simple and mixed cellulose esters which have been prepared by esterifying cellulose in the presence of at least one sulfuric acid radical containing catalyst, the process which comprises removed the harmful retained catalyst residues by thoroughly freeing such a cellulose ester from esterification bath residues and treating said ester in at least one stabilizing bath, in which said ester is substantially insoluble, containing at least one organic compound represented by the general formula

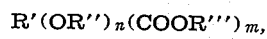

$$R'(OR'')_n(COOR''')_m,$$

wherein $R'$ and $R'''$ are radicals selected from the group consisting of hydrogen and hydrocarbon residues of low molecular weight, $R''$ is a hydrocarbon residue of low molecular weight, $m$ is an integer ranging from 1 upwards and $n$ is zero or an integer ranging from 1 upwards, while the sum of $m$ plus $n$ equals at least 2.

2. The process of claim 1 wherein said treating bath contains at least one inert organic diluent.

3. In the stabilization of simple and mixed cellulose esters which have been prepared by esterifying cellulose in the presence of at least one sulfuric acid radical containing catalyst, the process which comprises freeing such a cellulose ester from esterification bath residues, washing said ester with an inert liquid, which is a good solvent for the esterification catalyst employed during the esterifying process but which is a non-solvent for said ester, removing the washing liquid, contacting said ester with at least one organic compound which is susbstantially insoluble in water and in which water is substantially insoluble, and being represented by the general formula

wherein R' and R''' are radicals selected from the group consisting of hydrogen and hydrocarbon residues of low molecular weight, R'' is a hydrocarbon residue of low molecular weight, $m$ is an integer ranging from 1 upwards and $n$ is zero or an integer ranging from 1 upwards, while the sum of $m$ plus $n$ equals at least 2, and then treating the cellulose ester with an aqueous liquid in accordance with the emulsion or dispersion method for removal of the remaining catalyst residues.

4. In the manufacture of stabilized simple and mixed cellulose esters, the process which comprises esterifying cellulose according to the non-solvent or suspension method in the presence of a sulfuric acid radical containing catalyst, with an esterifying bath containing at least one non-solvent for said cellulose ester selected from the group consisting of hydrocarbons and organic compounds represented by the general formula

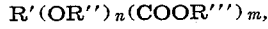

wherein R' and R''' are radicals selected from the group consisting of hydrogen, and hydrocarbon residues of low molecular weight, R'' is a hydrocarbon residue of low molecular weight, $m$ is an integer ranging from 1 upwards and $n$ is zero or an integer ranging from 1 upwards, while the sum of $m$ plus $n$ equals at least 2, and stabilizing the resulting cellulose ester without substantially dissolving the same by treating it with at least one bath containing at least one organic compound represented by the general formula

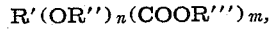

wherein R', R'', R''', $n$ and $m$ have their former significance.

5. In the process of preparing stabilized cellulose acetate, the process which comprises acetylating cellulose in a bath containing a sulfuric acid radical containing catalyst, in accordance with the non-solvent or suspension method, separating the resulting cellulose acetate from residues of the esterification bath, washing it with an inert liquid being a good solvent for the catalyst but being a non-solvent for the cellulose acetate, and stabilizing the cellulose acetate with at least one bath containing at least one compound represented by the general formula

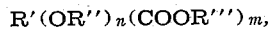

wherein R' and R''' are radicals selected from the group consisting of hydrogen and hydrocarbon residues of low molecular weight, R'' is a hydrocarbon residue of low molecular weight, $m$ is an integer ranging from 1 upwards and $n$ is zero or an integer ranging from 1 upwards, while the sum of $m$ plus $n$ equals at least 2.

6. The process in claim 1 wherein the organic compound in said stabilizing bath is a compound selected from the group consisting of polybasic organic acids and their esters, acid-esters, acid-ethers, esters of polyhydroxy compounds, esters of hydroxy-acids etherified in the hydroxy group and ester-ethers.

OTTO SINDL.
GEORG FRANK.